United States Patent
Barry

(10) Patent No.: US 9,617,872 B2
(45) Date of Patent: Apr. 11, 2017

(54) LOW PROFILE THERMALLY FREE BLIND LINER HANGER ATTACHMENT FOR COMPLEX SHAPES

(71) Applicant: United Technologies Corporation, Hartford, CT (US)

(72) Inventor: Thomas M. Barry, East Hampton, CT (US)

(73) Assignee: United Technologies Corporation, Hartford, CT (US)

(*) Notice: Subject to any disclaimer, the term of this patent is extended or adjusted under 35 U.S.C. 154(b) by 478 days.

(21) Appl. No.: 14/172,156

(22) Filed: Feb. 4, 2014

(65) Prior Publication Data

US 2014/0227093 A1 Aug. 14, 2014

Related U.S. Application Data

(60) Provisional application No. 61/764,785, filed on Feb. 14, 2013.

(51) Int. Cl.
*F02K 1/82* (2006.01)
*F01D 25/28* (2006.01)
*F01D 25/04* (2006.01)

(52) U.S. Cl.
CPC ............. *F01D 25/28* (2013.01); *F02K 1/822* (2013.01); *F01D 25/04* (2013.01); *Y02T 50/675* (2013.01); *Y10T 29/4932* (2015.01)

(58) Field of Classification Search
CPC .......... F01D 25/28; F01D 25/04; F02K 1/822; Y02T 50/675; Y10T 29/4932
See application file for complete search history.

(56) References Cited

U.S. PATENT DOCUMENTS

| | | | |
|---|---|---|---|
| 4,180,972 A | 1/1980 | Herman et al. | |
| 4,555,901 A | 12/1985 | Wakeman et al. | |
| 5,292,227 A | 3/1994 | Czachor et al. | |
| 5,323,601 A | 6/1994 | Jarrell et al. | |
| 5,704,208 A | 1/1998 | Brewer et al. | |
| 6,163,959 A | 12/2000 | Arraitz et al. | |
| 6,672,833 B2 | 1/2004 | MacLean et al. | |
| 7,339,244 B2 | 3/2008 | Subramanian et al. | |
| 7,721,522 B2 * | 5/2010 | Farah | F02K 1/002 60/39.5 |
| 2012/0233845 A1 | 9/2012 | Gerengi | |

\* cited by examiner

*Primary Examiner* — Richard Chang
(74) *Attorney, Agent, or Firm* — Kinney & Lange, P.A.

(57) ABSTRACT

A hanger system for connecting components in a gas turbine engine has a first spaced component, a second spaced component arranged a desired distance from the first spaced component, and a plurality of spacers arranged between the first spaced component and the second spaced component. A T-bar having a shaft portion and a crossbar is arranged between the components. The shaft portion of the T-bar passes through an aperture in the first spaced component and the crossbar portion of the T-bar is arranged adjacent to the second spaced component. A bracket is coupled to the second spaced component and substantially encapsulates the crossbar portion of the T-bar.

17 Claims, 4 Drawing Sheets

LOW PROFILE THERMALLY FREE BLIND LINER HANGER ATTACHMENT FOR COMPLEX SHAPES

CROSS-REFERENCE TO RELATED APPLICATION

This application claims the benefit of U.S. provisional application Ser. No. 61/764,785, entitled "LOW PROFILE THERMALLY FREE BLIND LINER HANGER ATTACHMENT FOR COMPLEX SHAPES," filed Feb. 14, 2013 by Dale William Petty. U.S. provisional application Ser. No. 61/764,785 is incorporated by reference herein.

BACKGROUND

Structures are often designed to be separated by a defined distance. Such structures may be separated for a variety of reasons, such as defining a plenum between the structures. Such structures may also operate at different temperatures.

Attachment of hot-side structures to cold-side structures can alleviate stresses associated to thermal gradients. For example, pin hung liners have been used to separate gas turbine engine liners from other structural components, such as ducts. Pin hung liners often utilize long pins, between about 10 cm. to 120 cm.

SUMMARY

A hanger connects spaced components. A first spaced component and a second spaced component are arranged a desired distance from one another. A T-bar has a shaft portion and a crossbar portion. The shaft portion of the T-bar passes through an aperture in the first spaced component, and the crossbar portion of the T-bar is arranged adjacent to the second spaced component. The T-bar connects the first and second components. A bracket is coupled to the second spaced component and substantially encapsulates the crossbar portion of the T-bar. 13.

A method for connecting components in a gas turbine engine, the method including inserting a T-bar having a crossbar portion and a shaft portion through a first spaced component, the shaft portion having a threaded portion at a distal end opposite the crossbar portion; attaching a bracket to the second spaced component, the bracket having a slot portion and an indent portion; passing the crossbar portion of the T-bar through the slot portion of the bracket, and rotating the T-bar such that the crossbar portion of the T-bar is captured by the indent portion; and threading a nut onto the threaded portion of the T-bar to attach the T-bar to the first spaced component.

A method of installing a liner in a gas turbine engine, the method including affixing a plurality of bracket components to a liner, the bracket components each having a slot and an indent; inserting a T-bar into the slot portion of each of the plurality of bracket components, each T-bar having a crossbar portion and a shaft portion, and the shaft portion having a threaded section; rotating each of the T-bars such that the T-bar is captured by the indent of the bracket; advancing the liner toward a structural component, such that the shaft portion of the T-bars pass through apertures in the structural component; and threading a nut onto the threaded section of each of the plurality of T-bars.

DETAILED DESCRIPTION

Figure 1:
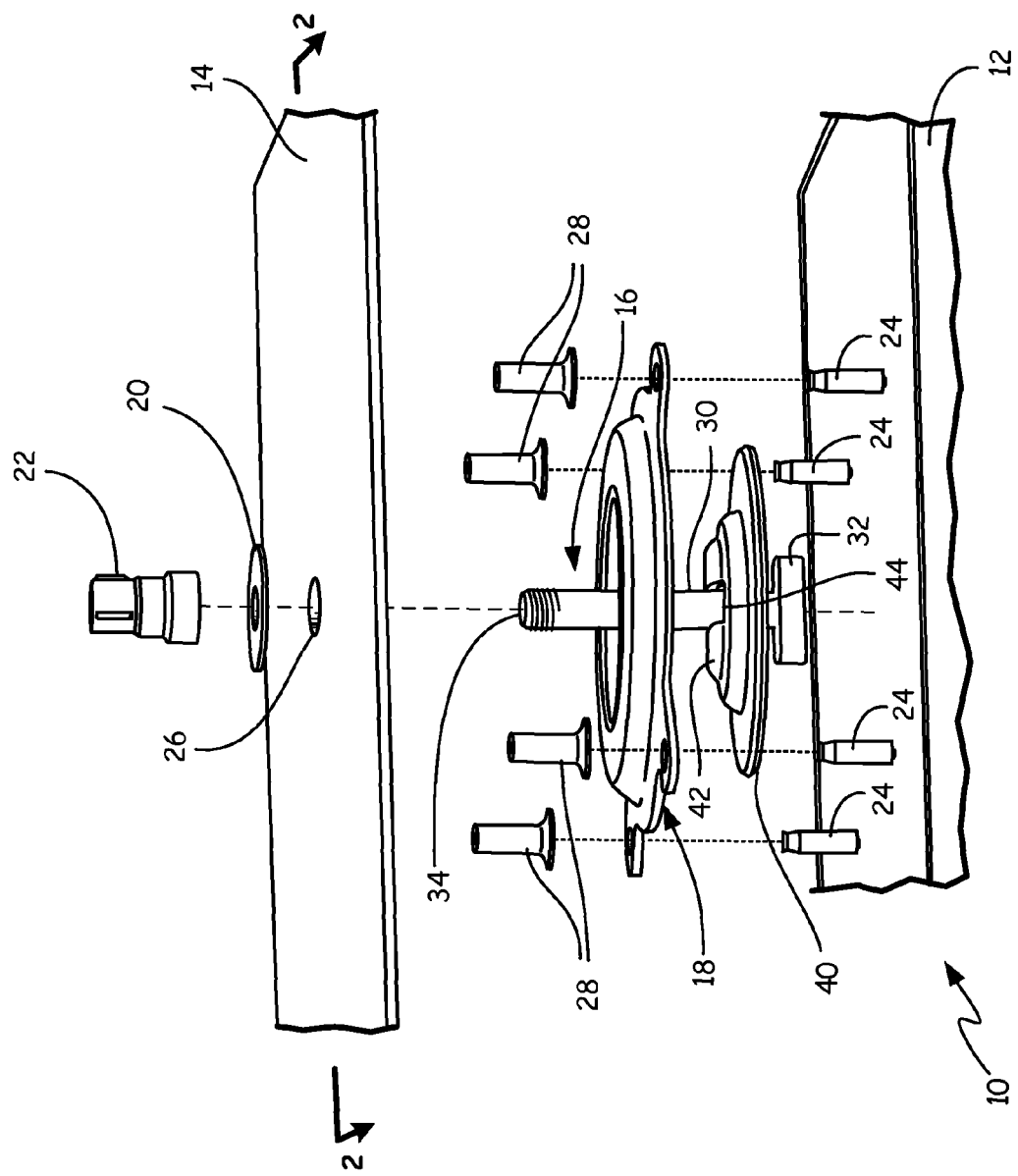
FIG. 1 is an exploded view of a hanger, liner, and structural component.

FIG. 1 is an exploded view of hanger 10, which allows for relative rotation of the components that it connects. In FIG. 1, hanger 10 is connecting liner 12 to duct 14. Hanger 10 includes T-bar 16, bracket 18, cap washer 20 and cap nut 22. T-bar 16 includes shaft portion 30, crossbar portion 32, and threaded portion 34. Bracket 18 includes washer portion 40, which includes washer recess 42 and washer cutout 44.

Liner 12 may be a liner in a gas turbine engine. For example, liner 12 may be an exhaust liner. Liner 12 includes pegs 24, which may be either attached to the rest of liner 12 or may be integrally formed with liner 12. Often, liner 12 is made from a material capable of withstanding extreme temperature and/or pressure, such as a high temperature superalloy. Receiving connectors 28 attach to pegs 24.

Duct 14 may be a wall to a high pressure plenum in a gas turbine engine, such as a wall to a cooling air plenum. Duct 14 is typically made from a non-porous material, such as metal, polymer, or carbon fiber based material. Duct 14 includes aperture 26, which is an aperture of appropriate size and shape to allow a portion of shaft portion 30 to pass therethrough. Duct 14 and liner 12 are two components that are spaced apart by a defined distance.

T-bar 16 abuts liner 12, such that crossbar portion 32 is in contact with liner 12. Shaft portion 30 extends through bracket 18, including passing through washer cutout 44. Crossbar portion 32 is prevented from moving away from liner 12 by washer portion 40. Washer recess 42 traps crossbar portion 38 to liner 12. Washer portion 40 is free to rotate within bracket 18, and T-bar 16 may move up to a desired distance away from liner 12 based on the snugness with which washer recess 42 traps crossbar portion 32. In many embodiments, a wear-resistant coating may be applied to components which move in relation to adjacent parts, such as washer portion 40 and/or crossbar portion 32.

T-bar 16 also connects to duct 14. Threaded portion 34 passes through aperture 26, such that cap washer 20 and cap nut 22 may be attached to threaded portion 34. Other connection means are possible rather than cap nut 22. For example, T-bar 16 may be connected to duct 14 using a pin, a toggle bolt, or other mechanical fasteners.

T-bar 16 is used to keep liner 12 at a desired distance from duct 14. Typical embodiments of liner 12 are annular, and typical embodiments of duct 14 are coaxial and circumscribe liner 12. Multiple hangers 10 may be used to hold liner 12 within duct 14. Each hanger 10 may be under load, such that liner 12 cannot move with respect to duct 14. Each hanger 10 prevents movement in the direction along which T-bar 16 extends. By allocating sufficient hangers 10 to hold liner 12 to duct 14, movement in any direction may be prevented.

Bracket 18 is attached to liner 12 and captures washer portion 40. Washer portion 40 may move relative to bracket 18, such as rotationally or, to a limited extent, transversely. In order to prevent damage due to such movement, bracket 18, washer portion 40, and liner 12 may be treated with a wear-resistant coating.

T-bar 16 is connected to duct 14 by cap washer 20 and cap 22. Cap 22 may thread onto threaded portion 34. In alternative embodiments, cap 22 may be any other device for fastening the end of T-bar 16 to duct 14. For example, in alternative embodiments of T-bar 16, threaded portion 34 may have a bore-hole rather than threading, and cap 22 may be a pin passing through the hole and extending along the surface of duct 14 around aperture 26.

Hanger 10 allows for rotation of liner 12 relative to duct 14. Wear protective coatings protect components such as crossbar portion 32 and washer portion 40 so that they are not damaged by such movement. In addition, the embodiment shown in FIG. 1 is thermally free, in that thermal transfer from liner 12 to duct 14 is unlikely. In a standard gas turbine engine, cooling fluid passes between liner 12 and duct 14. The only direct connection through which convective heat transfer may occur is T-bar 16. However, T-bar 16 is subject to significant impingement cooling, diminishing any heat transfer to a negligible amount.

Figure 2:
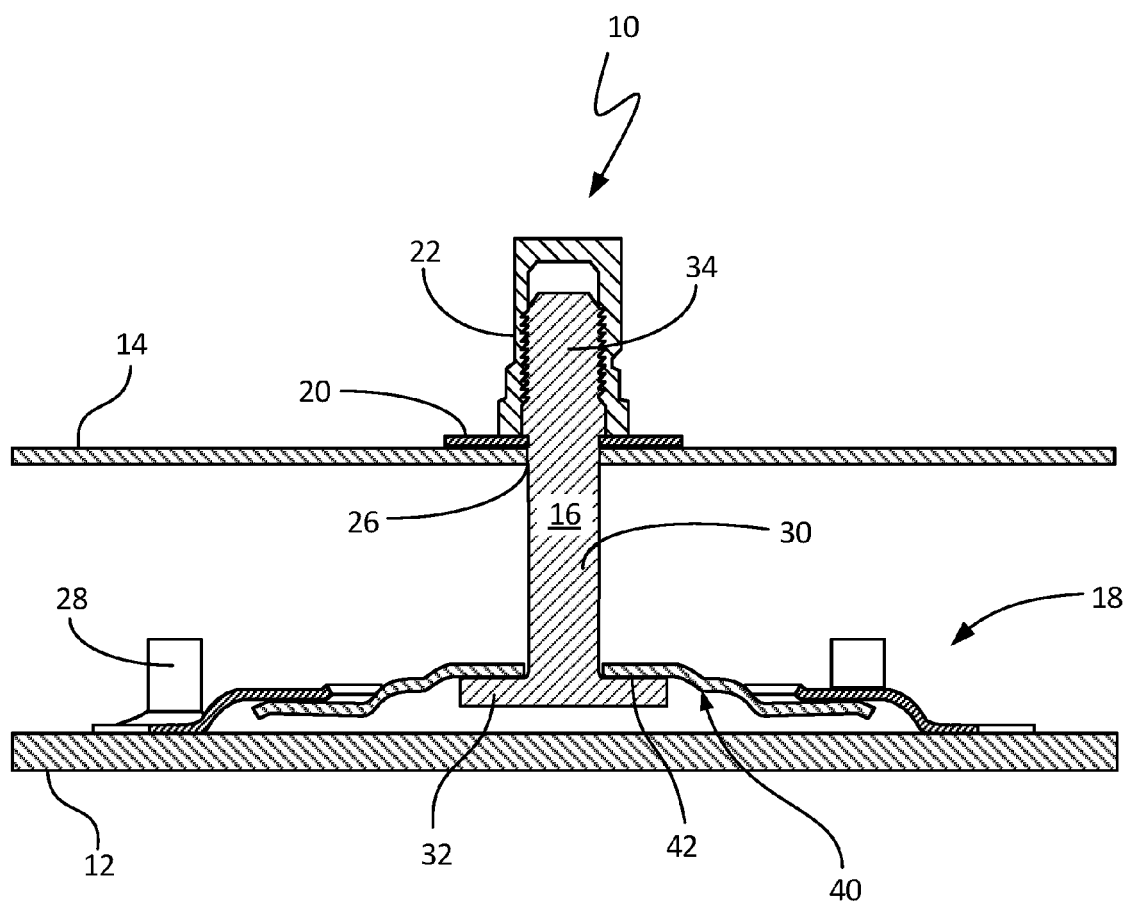
FIG. 2 is a cross-sectional view of the hanger, liner, and structural component through line 2-2.

FIG. 2 is a cross-sectional view of hanger 10 connecting liner 12 to duct 14 through line 2-2. Hanger 10 includes the same components as described with respect to FIG. 1, including T-bar 16, bracket 18, cap washer 20, and cap nut 22. Liner 12 includes pegs 24, which are shaped complimentary to receiving connectors 28. Duct 14 includes aperture 26.

T-bar 16 includes shaft portion 30, crossbar portion 32, and threaded portion 34. Bracket 18 includes washer portion 40, which includes washer recess 42 and washer cutout 44.

Figure 4:
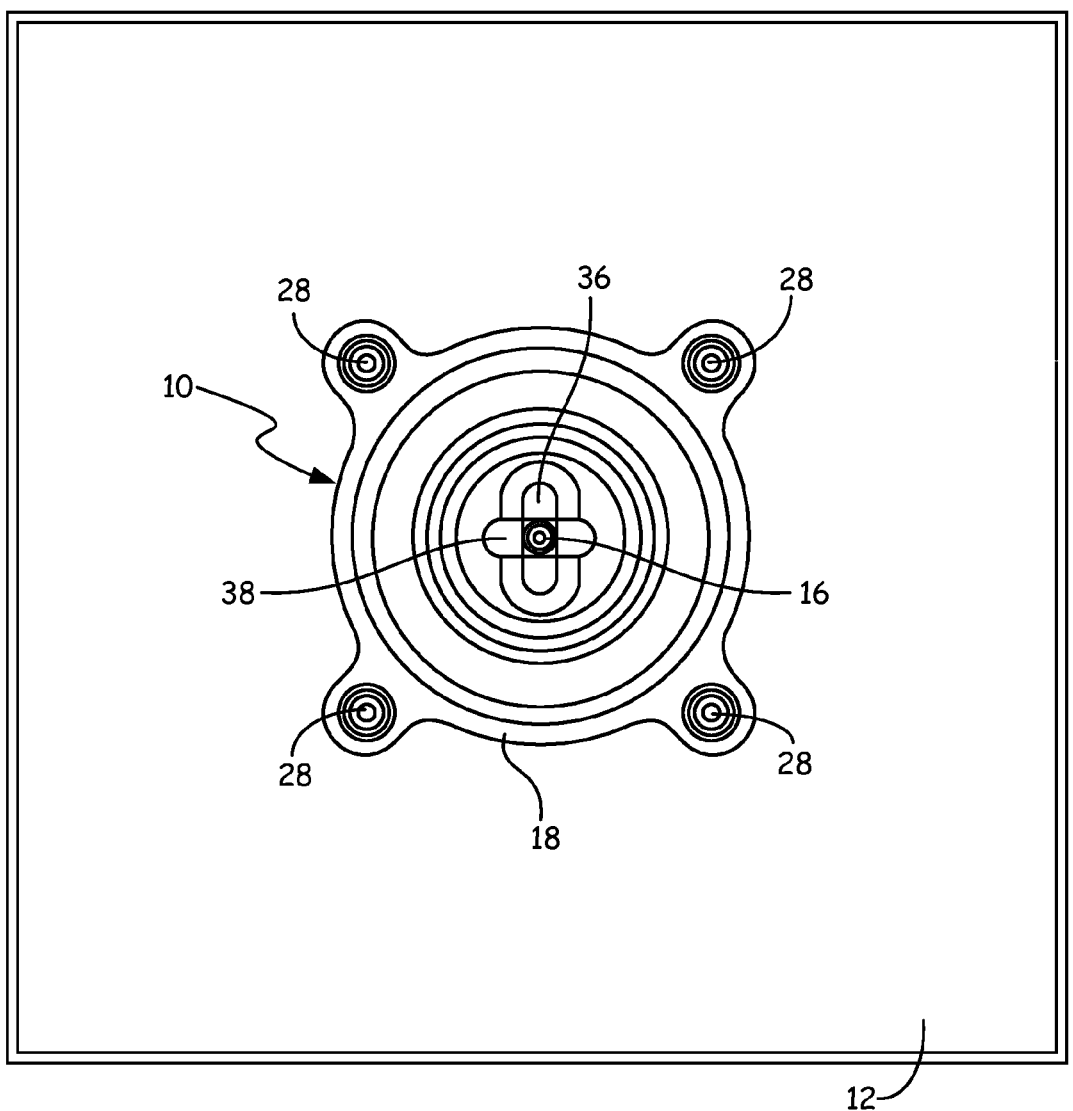
FIG. 4 is a plan view of the alternate embodiment hanger attached to the liner.

FIG. 2 shows how crossbar portion 32 is captured within washer recess 42, and how washer 40 is captured by bracket 18. As shown in FIG. 4, T-bar 16 is in direct contact with washer recess 42, such that a gap remains between T-bar 16 and liner 12. By increasing or decreasing the size of washer recess 42, this gap may be widened or narrowed. Additionally, washer portion 40 is not in direct contact with liner 12. By leaving a sufficient gap between washer portion 40 and liner 12, washer portion 40 is free to rotate within bracket 18. The sizes of each of these gaps, in addition to the length of shaft portion 30, determines the spacing of liner 12 from duct 14.

Figure 3:
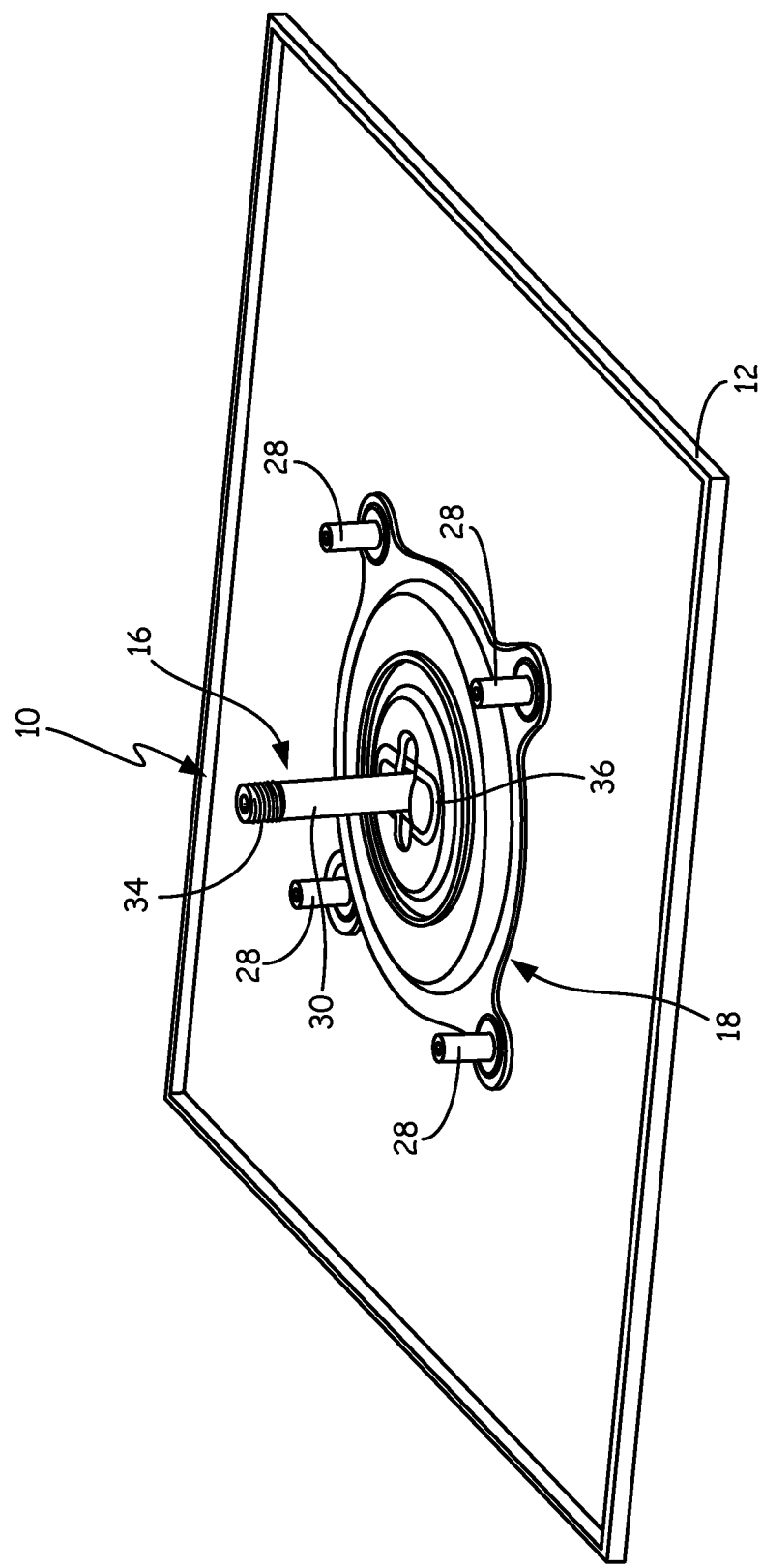
FIG. 3 is a perspective view of an alternate embodiment hanger attached to a liner.

FIG. 3 is a perspective view of hanger 10, which incorporates the invention, attached to liner 12. Hanger 10 includes T-bar 16 and bracket 18. T-bar 16 includes shaft portion 30 and threaded portion 34. T-bar 16 also includes a crossbar portion 32 (FIGS. 1-2). Bracket 18 includes recessed portion 36 and cutout portion 38. Liner 12 includes pegs 24 (FIG. 1), which are obscured in FIG. 3 by receiving connectors 28.

T-bar 16 is a structural element that is shaped roughly like a "T". T-bar 16 may be a commercially available T-bar. Shaft portion 30 is a portion of T-bar 16, and has threading on at least one distal end, threaded portion 34. T-bar 16 may be made of any material capable of bearing a desired load, such as metals or polymers.

Bracket 18 is a component capable of being fastened to other objects. Bracket 18 includes recessed portion 36, which may contain other components. Furthermore, bracket 18 includes cutout portion 38, through which other components may pass.

Liner 12 may be a liner in a gas turbine engine. For example, liner 12 may be an exhaust liner. Liner 12 includes pegs 24 (FIG. 1). The pegs may be either attached to the rest of liner 12 or may be integrally formed with liner 12. Often, liner 12 is made from a material capable of withstanding extreme temperature and/or pressure, such as a high temperature superalloy. Receiving connectors 28 attach to the pegs.

Hanger 10 is attached to liner 12. T-bar 16 is positioned such that bracket 18 connects T-bar 16 to liner 12. Shaft portion 30 extends from liner 12, with threaded portion 34 positioned at the furthest distal end from liner 12. Bracket 18 is positioned over a portion of T-bar 16. Recessed portion 36 traps a portion of T-bar 16 against liner 12. Cutout portion 38 is arranged in such a way that T-bar 16 may not be moved away from liner 12 through cutout portion 38. For example, where T-bar 16 includes crossbar portion 32 (FIGS. 1-2), recessed portion may substantially encapsulate crossbar portion 32 (FIGS. 1-2), such that it may not rotate and be drawn through cutout portion 38. Pegs (FIG. 1) pass through apertures in bracket 18 and receiving connectors 28 attach to pegs to connect bracket 18 to liner 12. In some embodiments, the pegs may be threaded or have other some other attachment mechanism to hold receiving connectors 28.

Because hanger 10 is attached to liner 12, other components may be attached to T-bar 16 and kept at a desired distance from liner 12. Often, such spacing is important to create or maintain proper airflow around liner 12, and to support liner 12. Hanger 10 may be affixed to even substantially more complex versions of liner 12, such as those with non-uniform curvature, or even discontinuities. This is an advantage over previous technologies, which often are best suited to uniform curvatures or flat liners.

In addition to an ability to connect spaced components with complex shapes, hanger 10 is low-profile. Hanger 10 does not significantly obstruct fluid flow in the vicinity surrounding liner 12. Bracket 18 is substantially coplanar with liner 12, and displacement of fluid flow by hanger 10 may be equal to or less than displacement of fluid flow by traditional pin-and-hanger systems.

Furthermore, hanger 10 may be installed despite limited working space and visibility. Often, liner 12 is attached to a second spaced component, such as duct 14 (FIGS. 1-2). The spacing between such components is often about 5 cm. or less. Because hanger 10 may be installed prior to attachment to a second spaced component, visibility and working space related issues are often obviated.

FIG. 4 is a plan view of hanger 10 attached to liner 12. As described with respect to FIG. 3, hanger 10 includes T-bar 16 and bracket 18. Pegs 24 (FIG. 1) extend through apertures in bracket 18, and fix the position of bracket 18 on liner 12. Cutout portion 38 is shown, which consists of an oblong aperture in bracket 18.

Cutout portion 38 may have a similar length and width as recessed portion 36. Thus, where T-bar 16 passes through cutout portion 38, crossbar portion 32 (FIGS. 1-2) may both pass through cutout portion 38 and be trapped between liner 12 and bracket 18.

T-bar 16 may be installed in bracket 18 using cutout 38 and recessed portion 36. T-bar 16, including crossbar 32 (FIGS. 1-2) may slide through cutout 38. By rotating T-bar 16, crossbar 32 (FIGS. 1-2) may be aligned with recessed portion 36. Bracket 18 is then affixed to liner 12 such that crossbar 32 (FIGS. 1-2) is trapped within the area defined by recessed portion 36 and liner 12.

The plan view shown in FIG. 4 demonstrates the low-profile nature of the hanger attachment. Impingement of fluid flow due to bracket 18 is minimal, due to its minimal height. Impingement of fluid flow due to T-bar 16 is also minimal, due to its relatively small size.

Listing of Potential Embodiments

The following are non-exclusive descriptions of possible embodiments of the present invention.

A hanger for connecting components in a gas turbine engine includes a first spaced component, a second spaced component arranged a desired distance from the first spaced component, a T-bar having a shaft portion and a crossbar portion, wherein the shaft portion of the T-bar passes through an aperture in the first spaced component, and the shaft portion of the T-bar defines a desired distance, a second spaced component arranged adjacent to the crossbar portion of the T-bar at the desired distance from the first spaced component, a bracket, wherein the bracket is coupled to the second spaced component and substantially encapsulates the crossbar portion of the T-bar.

The hanger of the preceding paragraph can optionally include, additionally and/or alternatively, any one or more of the following features, configurations, and/or additional components.

The first spaced component and the second spaced component may be separated by a distance determined by the length of the shaft portion of the T-bar. The first spaced component and the second spaced component may nonplanar. The hanger may include a hanger washer arranged between the bracket and the crossbar portion of the T-bar. The bracket may include a cutout larger than the crossbar portion of the T-bar. The bracket may include an indentation configured to capture the crossbar portion of the T-bar. The hanger may include a wear coating applied to the second spaced component and the bracket. The bracket may be welded to the second spaced component, or coupled with the second spaced component using a plurality of bolts. The shaft portion of the T-bar may include threading on the opposite distal end from the crossbar portion. The hanger may include a nut configured to screw on to the threading on the shaft portion of the T-bar. The hanger may also include a washer arranged between and adjacent to both the nut and the first spaced component.

A method for connecting components in a gas turbine engine includes inserting a T-bar having a crossbar portion and a shaft portion through a first spaced component, the shaft portion having threading at a distal end opposite the crossbar portion, attaching a bracket to the second spaced component, the bracket having a slot portion and an indent portion, passing the crossbar portion of the T-bar through the slot portion of the bracket, and rotating the T-bar such that the crossbar portion of the T-bar is captured by the indent portion, and threading a nut onto the threaded portion of the T-bar to attach the T-bar to the first spaced component.

The method of the preceding paragraph can optionally include, additionally and/or alternatively, any one or more of the following features, steps, and/or additional components.

The method may further include arranging a washer between the first spaced component and the nut. The method may further include arranging an insert layer between the crossbar portion of the T-bar and the bracket. The method may further include applying a wear coating to at least one of the second spaced component, the insert layer, and the T-bar. The method may include attaching the bracket to the second spaced component by welding the bracket to the second spaced component. The method may include attaching the bracket to the second spaced component by riveting the bracket to the second spaced component.

A method of installing a liner in a gas turbine engine includes: affixing a plurality of bracket components to a liner, the bracket components each having a slot and an indent, inserting a T-bar into the slot portion of each of the plurality of bracket components, each T-bar having a crossbar portion and a shaft portion, and the shaft portion having a threaded section, and rotating each of the T-bars such that the T-bar is captured by the indent portion of the bracket, advancing the liner toward a structural component, such that the shaft portion of the T-bars pass through apertures in the structural component, and screwing a nut onto the threaded section of each of the plurality of T-bars.

The method may further include inserting an insert portion between each of the plurality of bracket components and the liner.

Although the present invention has been described with reference to preferred embodiments, workers skilled in the art will recognize that changes may be made in form and detail without departing from the spirit and scope of the invention.

The invention claimed is:

1. A hanger system for connecting components in a gas turbine engine, the hanger system comprising:
   a first spaced component;
   a T-bar having a shaft portion and a crossbar portion, wherein the shaft portion of the T-bar passes through an aperture in the first spaced component, and the shaft portion of the T-bar defines a desired distance;
   a second spaced component arranged adjacent to the crossbar portion of the T-bar at the desired distance from the first spaced component; and
   a bracket, wherein the bracket is coupled to the second spaced component independently of the T-bar and substantially encapsulates the crossbar portion of the; and a hanger washer layer arranged between the bracket and the crossbar portion of the T-bar that is a separate component from the bracket and the T-bar.

2. The hanger system of claim 1, wherein the first spaced component and the second spaced component are separated by a distance determined by the length of the shaft portion of the T-bar.

3. The hanger system of claim 2, wherein the first spaced component and the second spaced component are nonplanar.

4. The hanger system of claim 1, wherein the bracket includes a cutout larger than the crossbar portion of the T-bar.

5. The hanger system of claim 1, wherein the bracket includes an indentation that is in direct contact with and is configured to capture the crossbar portion of the T-bar.

6. The hanger system of claim 1, wherein a wear coating is applied to the second spaced component and the bracket.

7. The hanger system of claim 1, wherein the bracket is coupled with the second spaced component by welding.

8. The hanger system of claim 1, wherein the bracket is coupled with the second spaced component using a plurality of bolts.

9. The hanger system of claim 1, wherein the shaft portion of the T-bar includes a threaded portion on the opposite distal end from the crossbar portion.

10. The hanger system of claim 9, and further comprising a cap nut configured to screw on to the threading on the shaft portion of the T-bar.

11. The hanger system of claim 10, and further comprising a washer arranged between and adjacent to both the cap nut and the first spaced component.

12. The hanger system of claim 1, wherein the crossbar portion is positioned between the second spaced component and the hanger washer layer of the bracket.

13. The hanger system of claim 1, wherein:
   the bracket includes a cutout that is larger than the crossbar portion of the T-bar;
   the hanger washer layer includes an indentation that is in direct contact with and is configured to capture the crossbar portion of the T-bar; and
   the cutout is perpendicular to the indentation.

14. A method for connecting components in a gas turbine engine, the method comprising:
- inserting a T-bar having a crossbar portion and a shaft portion through a first spaced component, the shaft portion having a threaded portion at a distal end opposite the crossbar portion, wherein the shaft portion of the T-bar defines a desired distance;
- inserting a hanger washer layer with a slot portion and an indent portion into a bracket;
- attaching the bracket to the second spaced component independently of the T-bar;
- passing the crossbar portion of the T-bar into the bracket such that the crossbar portion of the T-bar is substantially encapsulated by the bracket;
- passing the crossbar portion of the T-bar through the slot portion of the hanger washer layer, and rotating the T-bar such that the crossbar portion of the T-bar is captured by the indent portion; and
- threading a nut onto the threaded portion of the T-bar to attach the T-bar to the first spaced component at the desired distance.

15. The method of claim 14, and further comprising arranging a cap washer between the first spaced component and the nut.

16. The method of claim 14, and further comprising applying a wear coating to at least one of the second spaced component, the insert layer, and the T-bar.

17. A method of installing a liner in a gas turbine engine, the method comprising:
- inserting one of a plurality of hanger washer layers into one of a plurality of bracket components, wherein each of the plurality of hanger washer layers includes a slot portion and an indent portion;
- affixing a plurality of bracket components to a liner;
- inserting one of a plurality of T-bars into each of the plurality of bracket components such that the crossbar portion of the T-bar is substantially encapsulated by the bracket, each T-bar having a crossbar portion and a shaft portion, and the shaft portion having a threaded section and defining a desired distance;
- passing the crossbar portion of each of the plurality of T-bars through the slot portion of the one of the hanger washer layers, and rotating each T-bar such that the crossbar portion of each T-bar is captured by the indent portion;
- advancing the liner toward a structural component, such that the shaft portion of each of the T-bars pass through one of a plurality of apertures in the structural component; and
- threading a nut onto the threaded section of each of the plurality of T-bars to attach each of the plurality of T-bars to the first spaced component at the desired distance.

* * * * *